UNITED STATES PATENT OFFICE.

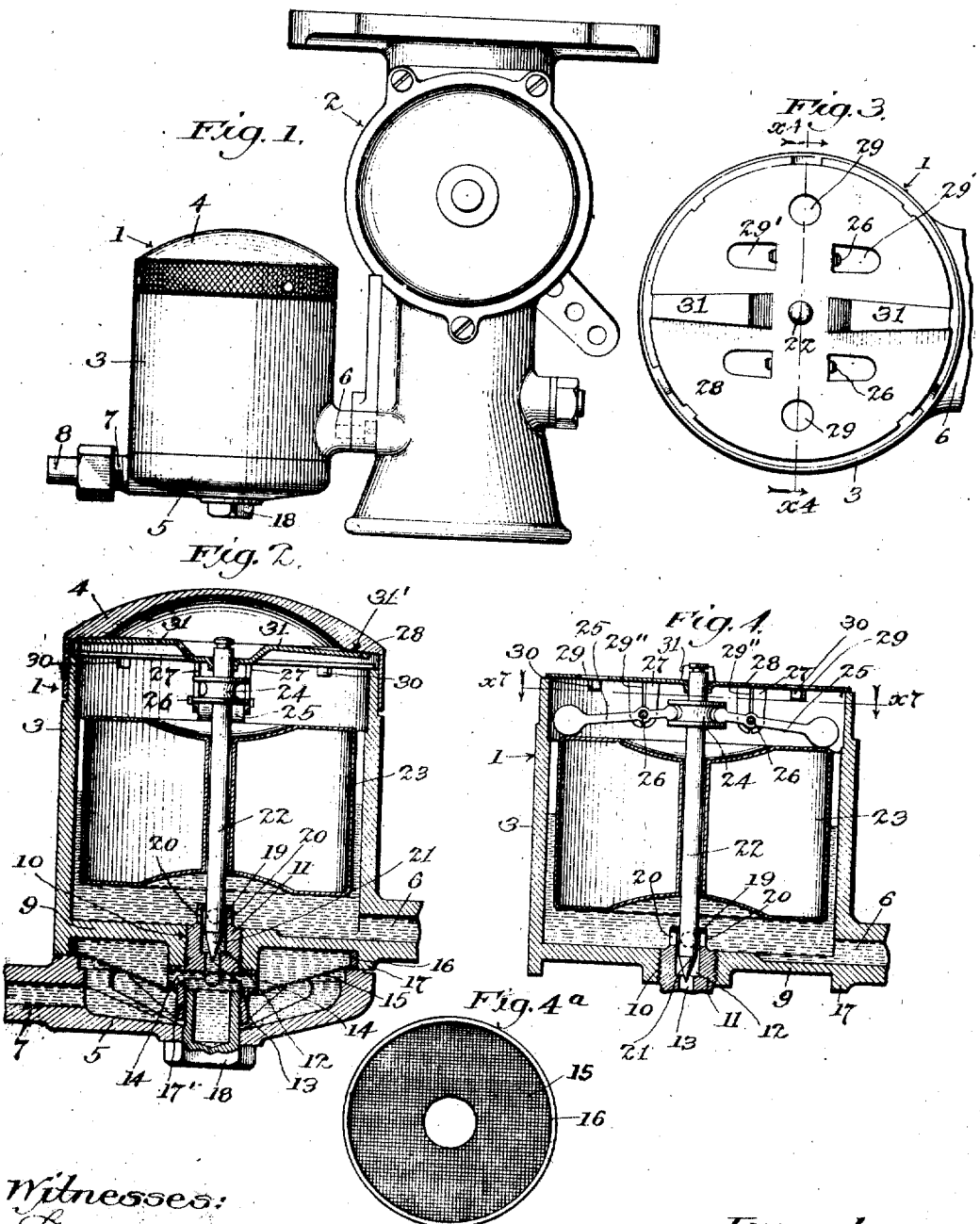

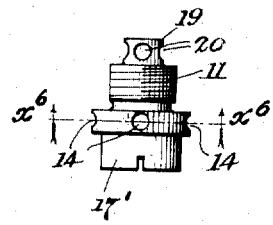
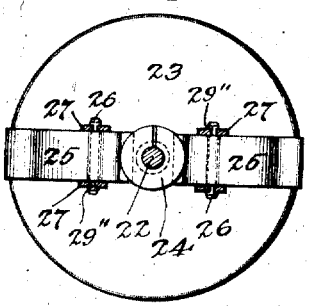
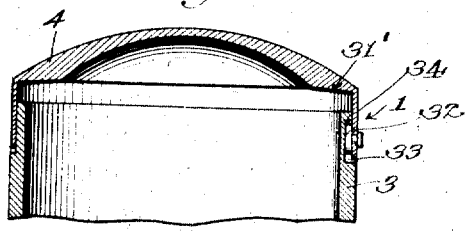
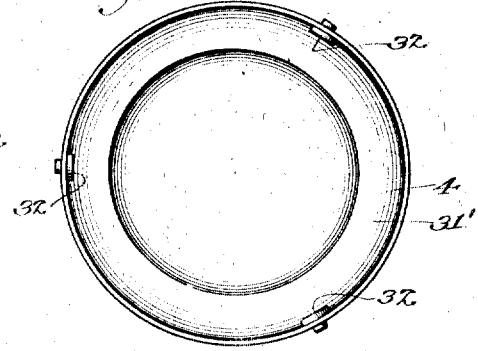
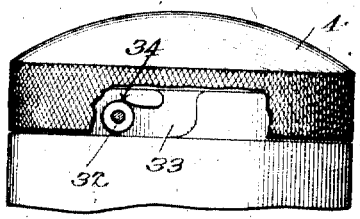
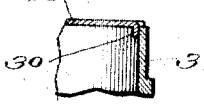

HARRY A. MILLER AND FRANK M. ADAMSON, OF LOS ANGELES, CALIFORNIA, ASSIGNORS TO MASTER CARBURETOR COMPANY, OF LOS ANGELES, CALIFORNIA, A CORPORATION OF CALIFORNIA.

CARBURETER.

1,227,817.     Specification of Letters Patent.     Patented May 29, 1917.

Application filed May 1, 1916. Serial No. 94,548.

*To all whom it may concern:*

Be it known that we, HARRY A. MILLER and FRANK M. ADAMSON, citizens of the United States, residing at Los Angeles, in the county of Los Angeles and State of California, have invented a new and useful Carbureter, of which the following is a specification.

This invention pertains to carbureters or liquid fuel and air mixers and more especially to the float chamber thereof and the various parts of said float chamber.

The mixing chamber and its parts is not claimed herein and is the subject of my copending application for patent for carbureters, filed May 1, 1916, Serial No. 94,549.

An object of this invention is to insure against leakage of the valve and consequent flooding of the carbureter.

Another object is to make provision for holding of the valve plug substantially in alinement with the valve seat when the valve plug is not on its seat so that as said plug moves toward said seat it will be properly centered while seating in order that the plug and seat will not be worn unevenly, such unevenness of wear producing leakage of the valve.

Another object of this invention is to so mount the float-operated levers as to insure against the pivots of said levers getting loose, it being understood that in the use of carbureters on automobiles, excessive vibration of the carbureter parts occurs under the usual running conditions, said vibration tending to jar the various parts and produce friction between the parts and consequent wear and looseness.

Another object is to produce a device of this character in which the valve plug, levers and float can readily be removed and one in which the valve plug and levers can be held securely in place regardless of their being readily removable.

Another object is to produce a device of this character of which the parts may be readily assembled and disassembled without the use of a wrench or other tool.

Another object is to provide for ready access to the interior of the float chamber and at the same time make provision for preventing as much as possible the entrance of dust and other foreign particles to the interior of said float chamber.

Other objects and advantages may appear in the subjoined detail description.

The accompanying drawings illustrate the invention:

Figure 1 is a side elevation of a carbureter embodying the invention.

Fig. 2 is an enlarged elevation mainly in vertical mid section of the float chamber in Fig. 1 showing the internal mechanism.

Fig. 3 is a plan view of Fig. 2, the cover being omitted for clearness of illustration.

Fig. 4 is a fragmentary elevation mainly in mid section on line indicated by $x^4$—$x^4$, Fig. 3.

Fig. 4$^a$ is a plan view of the strainer detached.

Fig. 5 is an elevation of the valve-seat member detached.

Fig. 6 is an inverted plan section on line indicated by $x^6$—$x^6$, Fig. 5.

Fig. 7 is a plan view from line indicated by $x^7$—$x^7$, Fig. 4, the pivot supports and valve stem being shown in cross section and the float chamber body being omitted.

Fig. 8 is a sectional detail of the upper portion of the float chamber.

Fig. 9 is an inverted plan view of the cover.

Fig. 10 is a side elevation of the upper portion of the float chamber, a portion of the cover being broken away to expose to view parts that would otherwise be hidden.

Fig. 11 is an inverted plan view of the valve plug and stem, the levers, and the support or plate to which the levers are attached. Two of the hangers and a portion of one of the levers are shown in section for clearness of illustration.

Fig. 12 is a detail showing a fragment of the lever support and float chamber body.

The carbureter is seen complete in Fig. 1 and comprises a float chamber, indicated in general at 1, and a mixing device, indicated in general at 2, said mixing device not being described in detail and claimed herein but being the subject of the herein before mentioned application for patent for carbureters.

The float chamber comprises three separable portions or members, a cylindrical chambered body 3, a cylindrical cover 4 and a cylindrical dirt trap 5. The body 3 is provided with an outlet 6 which communicates with the mixing device 2, and the dirt trap 5 is provided with an inlet 7 connected by a fuel supply pipe 8 to any suitable source of fuel supply, not shown.

The bottom 9 of the body 3 is provided with an orifice 10 into which is screw-threaded a valve-seat member 11 in the form of a double nipple provided with a valve seat 12 and a passage having a vertical portion 13 which communicates with laterally extending portions 14 in the valve-seat member, said laterally extending portions 14 opening outward into the interior of the dirt trap 5 above the level of a strainer that comprises a conical screen 15 fastened to a ring 16 fitting inside of a downwardly projecting annular flange 17 of the body 3. Into the externally smooth cylindrical lower end portion 17' of the valve-seat member is screw-threaded a headed chambered cap 18, the chamber of said cap communicating with the passage 13, 14, and the head of said cap bearing against the outer face of the dirt trap 5 so that when the cap is screwed up tight, the rim of the dirt trap 5 will be held tightly against the edge of the flange 17 to form a liquid-tight joint between the body 3 and dirt trap 5. The screen 15 fits the portion 17' of the valve seat member.

The valve-seat member 11 extends upward to form an annular guide 19 of less diameter than the inside diameter of the valve-seat member above the valve seat 12, there being ports 20 opening from the interior of the valve-seat member between the valve seat and guide into the interior of the body 3 to admit fluid hydrocarbons therethrough.

The passage 13, 14 is controlled by a needle valve plug 21 adapted to engage the seat 12, the stem 22 of said valve plug being of approximately the same diameter as the inside diameter of the guide 19, said guide thus functioning to maintain the valve plug 21 substantially in alinement with the seat 12, when said valve plug is raised off its seat, so that when the valve plug moves downward onto the seat it will be substantially centered relative to said seat in order that the valve plug will not strike the seat on one side only and thus wear the valve plug and seat unevenly, such uneven wearing being conducive to leakage of fluid through the valve seat when the valve plug is closed. Thus, it is clear, the construction just described will insure against the valve becoming leaky as is so often the case with carbureters now in use.

The valve stem 22 passes through the center of a suitable float 23 adapted to rise and fall according to the change of liquid level in the float chamber, and said float communicates its motion to the valve stem 22 by suitable mechanism which will now be described.

The valve stem 22 is provided with an annular flanged collar 24 which is loosely engaged between the flanges by the inner ends of levers 25, the outer ends of said levers resting loosely upon the float 23. The levers 25 are provided with pivots 26 having their ends compressed and seated between the furcations of hangers 27 which project downward from and are preferably formed integral with a support in the form of a plate 28 provided with orifices 29, 29'. The periphery of the plate 28 seats on the rim of the body 3 but is of less diameter than the inside diameter of the cover 4 so that the cover can telescope upon the body. The hangers 27 are formed by punching portions of the plate 28 downward to form the orifices 29' and slotting said portions at 29'' so that the ends of the pivots will be tightly held between adjacent furcations, said plate being formed of material having more or less spring quality thereto so that the pivots will always remain tightly seated between the furcations. This is important for the reason that in prior devices the pins are not so mounted and owing to the fact that the parts are subject to excessive vibration under running conditions of the automobile on which the carbureter is mounted, said pivots tend to work loose and wear their seats, and of course when said pivots are loose the adjustment of the needle valve plug relative to the float is so affected as to permit of increased rise of the liquid level in the float chamber and consequent flooding of the carbureter in a manner well understood in the art.

At the edge of the plate 28 are provided downwardly extending tongues 30 formed by punching of the plate downward. These tongues 30 are resilient and just fit inside of the rim of the body 3 so as to firmly hold the plate against lateral movement.

The plate 28 is provided with flat spring members 31 which may be formed by punching portions of said plate upward. The outer ends of said spring members 31 extend beneath and engage an annular shoulder 31' inside of the cover 4 so as to tend to raise said cover which is provided on the inner face of its rim with inwardly projecting lugs 32 formed, in this instance, by headed pins that extend through the rim of the cover and are headed over to hold them in place. The lugs 32, when the cover 4 is being placed on the body 3, are accommodated in recesses 33 opening from the rim of the body downward and extending circumferentially of said body, the upper edge of the circumferentially extending portion of each recess forming a stop 34 against which the appropriate lug 32 is held by pressure of the spring members 31. The under edges of the stops 34 extend aslant upward toward the inner ends of the recesses so that the cover 4 cannot be turned relative to the body 3 without depression of the cover relative to the body against the pressure of the spring members 31.

It is clear from the foregoing that the springs 31, lugs 32 and stops 34 function to resiliently hold the cover in place and to hold the plate 28 against upward movement. This construction is of great advantage in preventing looseness which so often results in carbureters from excessive vibration and which is so detrimental to the working parts of the float chamber. Dust is thus practically excluded from the float chamber and yet a partial vacuum will not be created in said float chamber because of the communication of the interior of said float chamber with the atmosphere through the recesses 33.

In practical operation, assuming that the fuel supply pipe 8 is connected to a suitable source of liquid hydrocarbon supply, the level of said liquid rising in the float chamber body 3 will lift the float 23 and thereby operate the levers 25 to cause downward movement of the valve stem 22 to shut off the supply.

When the engine, to which the carbureter is attached, is in operation the liquid hydrocarbons pass to the mixing device 2 through the outlet 6, and lowering of the liquid level in the float chamber, as is well understood, lowers the float 23 so as to admit a sufficient quantity of liquid hydrocarbon to the float chamber to compensate for the liquid hydrocarbons flowing through the outlet 6.

Any dirt or other foreign particles entering the dirt trap 5 through the inlet 7 will be excluded from entering the passage 13, by reason of the screen 15, and it is clear that when it is desired to clean out the foreign particles that have collected in the dirt trap 5, all that is necessary is to disconnect the supply pipe 8 from the dirt trap 5 and remove the cap 18 and at the same time remove said dirt trap without molestation of the strainer. This is an advantage because if it were necessary to remove the strainer in order to obtain access to the foreign matter to be removed from the dirt trap, the screen might become bent so that it would be ineffectual in straining of the fluid hydrocarbon. However, if for some reason or other, it becomes desirable to remove the strainer as well as the dirt trap, with this invention the strainer may be easily removed without bending of the screen, for all that is necessary is to slip the screen with its ring out of the annular flange 17, said screen readily sliding over the smooth lower portion of the valve-seat member so that no injury results to the screen.

The foregoing will enable those skilled in the art to which this invention appertains to make and use said invention.

We claim:

1. In a carbureter, a float chamber body, a valve plug to control the admission of fuel to said body, a float in said float chamber body, a plate having hangers, levers operated by said float and connected to the valve plug to operate said plug and pivoted to said hangers, said plate having spring members engaged by the cover, and said cover being provided with means to hold it toward the body against the expansion force of said spring members.

2. In a carbureter, a float chamber body, a valve plug to control the admission of fuel to said body, a float in said float chamber body, a plate having furcated hangers of spring material, levers operated by said float and connected to the valve plug to operate said plug, and pivots for said levers, the ends of said pivots being compressed between the furcations of the hangers.

3. In a carbureter, a float chamber body having recesses extending downward from its upper edge and extending circumferentially, a valve plug to control the admission of fuel to said body, a float in said float chamber body, means operated by said float and connected to the valve plug to operate said plug, a cover for the body, lugs projecting inward from the cover to engage said recesses, means supported by the body to support the plug-operating means, and spring members on said supporting means engaging the inside of the cover to force said cover outward against the upper edges of the recesses.

4. In a carbureter, a float chamber body having recesses extending downward from its upper edge and extending circumferentially, a valve plug to control the admission of fuel to said body, a float in said float chamber body, a plate having hangers, levers operated by said float and connected to the valve plug to operate said plug and pivoted to said hangers, said plate having spring members engaged by the cover, and lugs projecting inward from the cover to engage said recesses.

5. In a carbureter, a body having an annular flange, a ring fitting inside of said flange, a screen fixed to said ring, a dirt trap, means forming a passage from the space above the screen to the body, a valve plug to control the flow of liquid through said passage, and means detachably holding the dirt trap in engagement with said flange, said means including a cap extending through the screen and engaging the passage-forming means.

6. In a carbureter, a body having an annular flange, a valve-seat member extending through an orifice in the bottom of said body and provided with a vertical passage and with a laterally extending passage communicating with the vertical passage and provided with an externally smooth portion, a dirt trap, a headed cap screw-threaded into said portion and having its head engaging the outside of the dirt trap to hold said trap toward said body, and a screen fitting said portion and extending outwardly to the annular flange, and a valve plug to control the flow of liquid through the vertical passage.

7. In a carbureter, a float chamber body, a valve seat member screw-threaded into an orifice in the bottom of said body and provided with a passage for liquid fuel and with a valve seat in said passage, said seat member being provided with an annular guide of less diameter than the inside diameter of the seat member above the seat, there being ports between the annular guide and the seat, a valve stem substantially fitting said annular guide and provided with a needle valve plug to engage said valve seat, a float operatively connected to the valve stem, a dirt trap, and a headed cap screw-threaded into the seat member and having its head engaging the outside of the dirt trap to hold said trap toward said body.

8. In a carbureter a hollow body, a valve seat member projecting into said body and provided with a passage for liquid, a plate detachably resting on the rim of said body and having flat spring members, a float in the hollow body, a valve plug to control said passage and provided with a stem extending through the float and through said plate, a collar on the valve stem, means mounted beneath the plate for operatively connecting said collar and float together, a cover having an annular shoulder engaging said spring members, and means coöperating with said spring members to fasten said cover to said body to hold it in place.

Signed at Los Angeles, California, this 21st day of April, 1916.

HARRY A. MILLER.
FRANK M. ADAMSON.

Witnesses:
GEORGE H. HILES,
ANNA F. SCHMIDTBAUER.